United States Patent [19]

Imai et al.

[11] Patent Number: 4,796,089

[45] Date of Patent: Jan. 3, 1989

[54] TELEVISION RECEIVER DISPLAY APPARATUS HAVING MULTI-IMAGE DISPLAY CAPABILITY

[75] Inventors: Kiyoshi Imai; Kazumi Kawashima; Makoto Ishida, all of Osaka, Japan

[73] Assignee: Matsushita Electric Industrial Co., Ltd., Osaka, Japan

[21] Appl. No.: 942,914

[22] Filed: Dec. 17, 1986

[30] Foreign Application Priority Data

Dec. 17, 1985 [JP] Japan .................. 60-283521

[51] Int. Cl.⁴ .................................. H04N 5/262
[52] U.S. Cl. .................................. 358/183; 358/22; 358/182
[58] Field of Search .................. 358/188, 183, 22, 182

[56] References Cited

U.S. PATENT DOCUMENTS

| 4,139,860 | 2/1979 | Micic et al. ........................ 358/22 |
| 4,249,211 | 2/1981 | Baba et al. ........................ 358/183 |
| 4,249,213 | 2/1981 | Imaide et al. ..................... 358/183 |
| 4,278,993 | 7/1981 | Suzuki ............................... 358/22 |
| 4,298,891 | 11/1981 | Baba et al. ........................ 358/183 |
| 4,638,360 | 1/1987 | Christopher et al. ............. 358/183 |

FOREIGN PATENT DOCUMENTS

55-39472 3/1980 Japan .
59-19504 6/1984 Japan .

*Primary Examiner*—James J. Groody
*Assistant Examiner*—John K. Peng
*Attorney, Agent, or Firm*—Lowe, Price, LeBlanc, Becker & Shur

[57] ABSTRACT

A television receiver display system for displaying, within a main image produced from a first video signal, one or more secondary images produced from a second video signal. Successive frames or fields of picture data of the second video signal are stored in an image memory, and successive lines of that data are read out to be alternately written into a pair of line memories, and subsequently alternately read out from the line memories in synchronism with the horizontal sync periods of the first video signal and at a higher data transfer rate than the write-in rate, to be then combined with video data of the first video signal and applied to a display.

3 Claims, 7 Drawing Sheets

TELEVISION RECEIVER DISPLAY APPARATUS HAVING MULTI-IMAGE DISPLAY CAPABILITY

BACKGROUND OF THE INVENTION

The present invention relates to a display apparatus for a television receiver having a capability for simultaneously displaying two different images combined on a single display screen, with one of the images being formed in reduced size within a portion of the other image.

Television receivers are increasingly coming into use which have a capability for simultaneously displaying two images, e.g. pictures derived from two different television broadcast channels, combined upon a single display with one of the images is formed in reduced size within the other image. With such a receiver it is necessary to match the vertical scanning signals of video signals from which the two images are derived. In addition, it is necessary to incorporate an image memory, i.e. a memory which can store one frame (or one field) of video data. In recent years it has become practicable to manufacture such television receivers, due to the rapid reductions which have been achieved in the costs of digital memory devices.

Figure 1A:
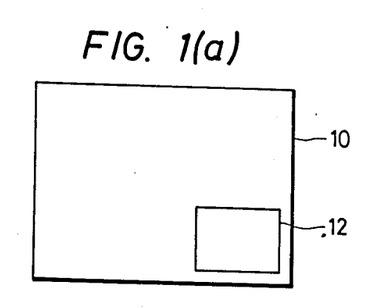
FIG. 1(a) and 1(b) show television displays of combined images.
Figure 1B:
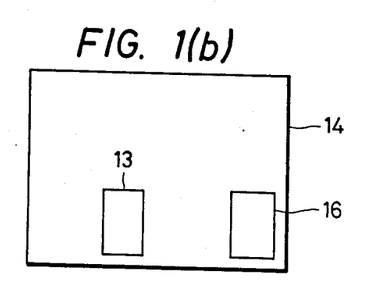

FIGS. 1(a) and 1(b) illustrate two possible display arrangements for such a dual-image television receiver. In the example of FIG. 1(a), a single secondary image 12 is combined with a main image 10, with the secondary image 12 being reduced to ⅓ of the size of the main image 10 and formed within a portion of main image 10.

Figure 2:
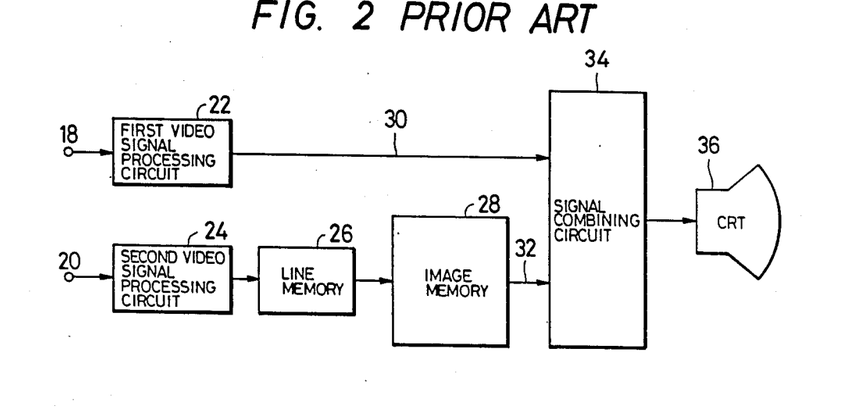
FIG. 2 is a simplified block circuit diagram of an example of a prior art television receiver for producing a combined-image display.
Figure 3:
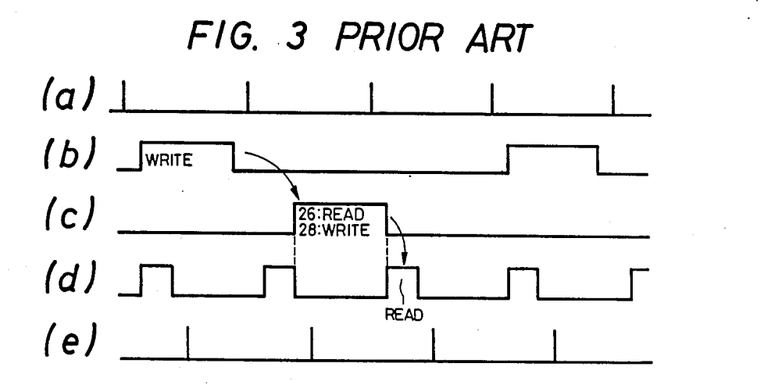
FIG. 3 is a waveform diagram for describing the operation of the example of FIG. 2.

FIG. 2 is a general block diagram of a prior art example of such a dual-image television receiver, while FIG. 3 is a waveform diagram for illustrating the operation of the television receiver of FIG. 2. In FIG. 2, numeral 18 denotes an input terminal to which is applied a first composite video signal, 20 denotes an input terminal to which is applied a second composite video signal, 22 denotes a first video signal processing circuit, 24 denotes a second video signal processing circuit, 26 denotes a line memory (i.e. a memory device capable of storing data representing one line of video data, produced between successive horizontal sync pulses), 28 denotes an image memory, and 34 denotes a signal combining circuit for combining the video data from the first and second composite video signals to produce the main image and secondary image. This function is executed by appropriate switching operations to selectively connect a first video signal (indicated by numeral 30) and a second video signal (indicated by numeral 32) to a CRT 36.

FIGS. 3(a) and 3(e) respectively show the horizontal sync signal waveforms of the first and second composite video signals applied to input terminals 18 and 20 respectively. It is assumed in this example that the ratio of the sizes of the main image 10 and the secondary image 12 is 3:1. In order to accomplish compression of the secondary image 12 in the vertical direction, only one every three horizontal scanning lines of the second video signal is supplied as data to the line memory 26, as illustrated by waveform 3(b). In general, one in ever m lines (where m is an integer) will be selected, in accordance with the degree of size reduction applied to the secondary image. This data is transferred to the image memory 28 at the timings shown as waveform 3(c). As shown by FIG. 3(d), the lines of second video signal data are successively read out of the image memory 28 during respective time intervals which are made sufficiently short to attain the desired 3:1 compression of that data along the time axis. In this way, a 3:1 compression of the secondary image is attained along the horizontal axis of the display.

If the secondary image 302 is to be displayed at the extreme right side of the main image 10, then the data for secondary image 302 must be read out of the image memory 28 at a speed which is three times that at which the data is written into image memory 28, i.e. as illustrated by waveform 3(d). This data read-out is performed with a fixed phase relationship to the horizontal sync pulses of the first video signal. Due to the fact that read-out is performed at a higher speed in this way, it is not possible to perform write-in of data to the image memory during each read-out interval from that memory. For this reason, the transfer of data to the image memory 28 from the line memory 26 is executed during inervals in which data is not being written into line memory 26, i.e. as illustrated by waveform 3(c), and while data is not being read out of the image memory 28.

In the signal combining circuit 34, second video signal 32 is selected to be applied to the CRT during intervals in which the signal shown in FIG. 3(d) is at the high logic level and the first video signal 30 is selected during intervals in which the waveform of FIG. 3(d) is at the low logic level. In ths way, the main image 10 and secondary image 12 are combined to form a dual-image display on the screen of CRT 36 as shown in FIG. 1(a).

However with a prior art television receiver having the configuration described above, the problem arises of limitations on positions (along the horizontal axis of the display) at which the secondary image 12 can be displayed. Comparing waveforms 3(c) to 3(e), then when a secondary image is to be displayed which is smaller than the main image by a factor of 3:1, if each of the time intervals in which the data for successive lines of the secondary image is not made equal to or less than ⅓ of the horizontal scanning interval of the main image, so that the maximum data sampling time is ⅔ of that horizontal scanning interval, then the requirements described above for producing the secondary image within the main image will not be satisfied. As a result, there will be insufficient data transferred to the CRT, i.e. that all of the data for each line of the secondary image will not be transferred to the CRT during each CRT scanning line, and portions at the left or right side of the secondary image may not appear on the display. Furthermore, it would be impossible in principle with such a prior art television receiver to produce a multi-image display of the form shown in FIG. 1(b), in which a plurality of secondary images, e.g. secondary images 13 and 16, are displayed in combination with a main image 14. The contents of each of these secondary images is identical.

SUMMARY OF THE INVENTION

It is an objective of the present invention to overcome the problem described above, and to provide a television receiver having a multi-image display capability in which no limitations are placed upon positions at which secondary images are positioned along the horizontal display axis or upon the number of secondary images which can be displayed.

To attain these objectives, a television receiver according to the present invention for displaying within a portion of a main image, representing video data of a first cmmposite video signal, at least one secondary image representing video data of a second composite video signal, essentially comprises:

first and second video signal processing circuit means for producing said video data from said first and second composite video signals, with at least said second video signal processing circuit means functioning to convert said second video data into successive data units corresponding to respective picture elements;

an image memory capable of of storing video data corresponding to one frame of said secondary image;

first and second line memories capable of storing video data corresponding to one line of said secondary image;

memory control circuit means for writing into said image memory a predetermined number of data units of one in every m successive scanning lines (where m is an integer) of said video signal from said second video signal processing circuit at a first data transfer rate, in synchronism with horizontal sync pulses contained in said second composite video signal, reading out at said first data transfer rate successive lines of said video data from said image memory in synchronism with said horizontal sync pulses and writing said lines of video data alternately into said first and second line memories, and alternately reading out said lines of video data from said first and second line memories in synchronism with horizontal sync pulses contained in said first composite video signal, said write-in and read-out operations being executed alternately by each of said line memories, said read-out operations being executed at a data transfer rate which is substantially equal to m times that of said first data transfer rate;

signal combining means for combining said video data from said first video processing circuit means with said video data read out from said first and second line memories to produce combined video data, and;

display means for displaying said combined video data to produce said main image and secondary image.

In a television receiver according to the present invention, the duration of each period for which a video signal is read out from a line memory, to apply time-axis compression to that data, and the number of such read-out operations which can be performed during each horizontal scanning interval of the display, is separated from the read and write operations which are executed by the image memory. As a result, the duration of the intervals in which successive lines of the secondary image are transferred to the display, and the number of such transfers which are executed during a horizontal scanning interval of the display, can be freely selected. Thus there are no limitations upon the size of the secondary image relative to the main image, or upon the number of secondary images which can be displayed.

DESCRIPTION OF THE PREFERRED EMBODIMENTS

Figure 4:
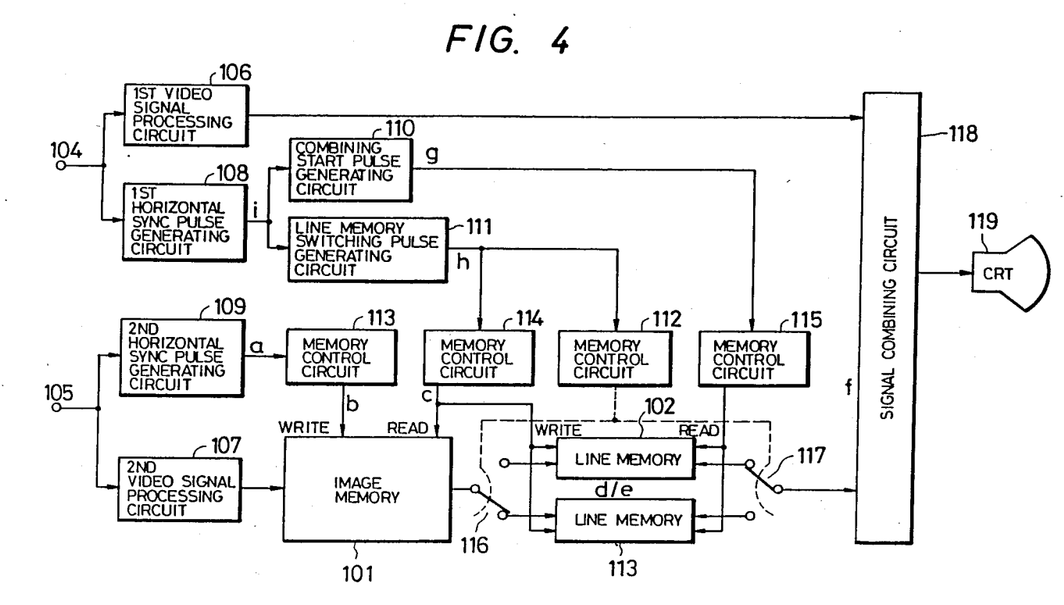
FIG. 4 is a block circuit diagram of a first embodiment of a television receiver according to the present invention.

An embodiment of a television receiver according to the present invention will now be described, referring first to FIG. 4. In FIG. 4, numeral 101 denotes an image memory which is capable of storing one frame (or one field) of data of video signal, with video data being written and read from image memory 101 in picture element units. Numeral 102 denotes a line memory, capable of storing video data of one line (i.e. picture data within one horizontal scanning interval) of a video signal. Numeral 103 denotes a line memory which is similar to line memory 102, numeral 104 denotes an input terminal to which is applied a first composite video signal, numeral 105 a second input terminal to which is applied a second composite video signal. Numeral 106 denotes a first video signal processing circuit, and numeral 107 a second video signal processing circuit. Numeral 108 denotes a first horizontal sync pulse generating circuit for deriving horizontal sync pulses (referred to in the following as the first horizontal sync pulses) from the first composite video signal, and 109 denotes a second horizontal sync pulse generating circuit for deriving horizontal sync pulses (referred to in the following as the second horizontal sync pulses) from the second composite video signal. Numeral 110 denotes a circuit for generating combination start pulses. A set of n of these pulses are produced within each period of the first horizontal sync pulses. The combination start pulse 110 comprises a circuit for counting pulsss of a clock signal which is generated in synchronism with the first horizontal sync pulses, and producing one combination start pulse each time a predetermined number of these clock pulses has been counted.

Numeral 111 denotes a line memory switching pulse generating circuit, which produces pulses each of which is of identical timing to the leading pulse in a set of n combination start pulses. This circuit can have a similar configuration to the combination start pulse generating circuit 110. Numeral 112 denotes a first memory control circuit, numeral 113 a second memory control circuit, 114 a third memory control circuit and 115 a fourth memory control circuit. Numerals 116 and 117 denote switches, 118 a signal combining circuit for combining the first and second video signals. Numeral 119 denotes a CRT upon which the combined video data is displayed.

The operation of this embodiment will first be described for the case of a television receiver which provides a dual-image display, such as that shown in FIG. 1(a), referring to the waveform diagram of FIG. 5. As can be understood by comparing the waveforms of FIGS. 5(i) and 5(g), one pulse of the output from combination start pulse generating circuit 110 is produced within each period of the first horizontal snnc pulses (shown in FIG. 5(i)). To produce a dual-image display, it is necessary that pulses having a fixed phase relationship to the first horizontal sync pulses are generated by the combination start pulse generating circuit 110, and it will be assumed for the purposes of explanation that this fixed phase relationship is as shown in FIG. 5.

Figure 5:
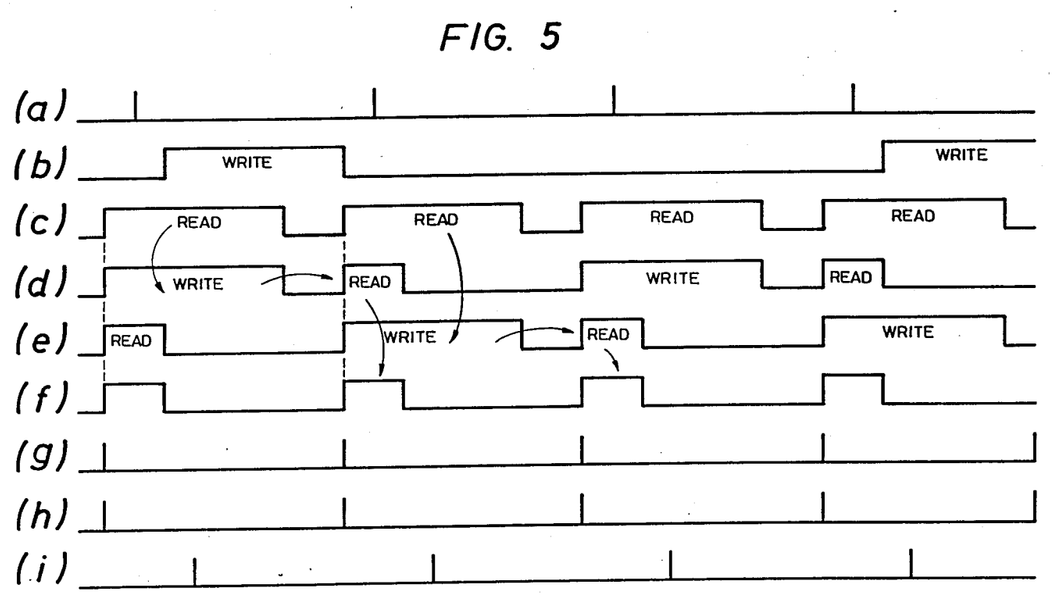
FIG. 5 is a waveform diagram for describing the operation of the embodiment of FIG. 4.

In order to render the vertical height of the secondary image 12 equal to ⅓ that of the main image 102, only one in every three horizontal scanning lines of the second video signal is written into the image memory 101, by output signals from the second memory control circuit 103, as illustrated in FIG. 5(b). Read-out from the image memory 101 is executed under the control of the third memory control circuit 113, at the same speed at which data write-in to memory 101 is performed, as illustrated by the waveform of FIG. 5(c). These read and write operations by the image memory 101 are performed at the same rates of data transfer. The time-overlapping portions of waveforms 5(b) and 5(c), i.e. the times at which both write-in and read-out operations are being performed by image memory 101, are made possible by the fact that data is transferred to and from the memory in picture element units (i.e. data units representing respective picture elements). That is to say, during these overlapping time intervals, write-in and read-out operations are alternately performed for successive picture elements units. In this way, data which is read out from the image memory 101 can be rapidly transferred to line memory 102 of line memory 103.

Switch 116 selectively transfers the read output data from image memory 101 to be read into either line memory 101 or line memory 102, under the control of the output signal from memory control circuit 112. Switch 117 selectively transfers the write output data from either line memory 101 or line memory 102 to be transferred to signal combining circuit 112, also under the control of the output signal from memory control circuit 112. Switches 116 change between the condition shown in FIG. 4 (i.e. write-in to line memory 103, and read-out from line memory 102) the opposite condition (write-in to line memory 102, and read-out from line memory 103) each time one of the line memory switching pulses (in FIG. 5(h)) is produced.

In order to achieve 3:1 compression of the secondary image along the horizontal axis of the display, data read-out from line memories 102 and 103 is performed at three times the rate of data transfer which is employed during data write-in to these line memories. Each data read-out operation from line memories 102 or 103 is initiated by a combination start pulse produced by circuit 110. The waveform of FIG. 5(f) is that of a control signal within signal combining circuit 118, which controls video data transfer to the CRT 119. When that waveform is at the high logic level, the output video signal from line memory 102 or line memory 103 (as determined by the position of switch 117) is transferred to the output of signal combining circuit 118, while when the waveform of FIG. 5(f) is at the low logic level, the output video signal from the first video signal processing circuit 106 is transferred to the output of signal combining circuit 118. In this way, a combined video signal is produced from signal combining circuit 118, which produces a dual-image display on CRT 119 such as that shown in FIG. 1(a).

The operation of this embodiment will now be described, referring to the waveform diagram of FIG. 6, for the case in which two secondary images are displayed, as shown in FIG. 1(b). In this case, the number of combination start pulses which are produced within each period of the first horizontal sync pulses (i.e. the integer n mentioned hereinabove) is made equal to 2. The first horizontal sync pulses are shown in FIG. 6(i), while the combination start pulses are shown in FIG. 6(g). As shown, two combination start pulses are produced by circuit 110 within each period of the horizontal sync pulses shown in FIG. 6(i). As in the example described with reference to FIG. 5 above, alternation is executed between a condition of data write-in to line memory 103 with data read-out from line memory 102 and a condition of data write-in to line memory 102 with data read-out from line memory 103, with change-over between these conditions occurring each time one of the line memory switching pulses shown in FIG. 6(h) occurs. This example differs from that of FIG. 5 in that two data write-in operations are executed for line memory 102 or line memory 103 during each period of the first horizontal sync pulses, in synchronism with the combination start pulses shown in FIG. 6(g). It should be noted that if the integral number of combination start pulses n is made equal to 3 or more, it is possible to display 3 or more secondary images.

Figure 7:
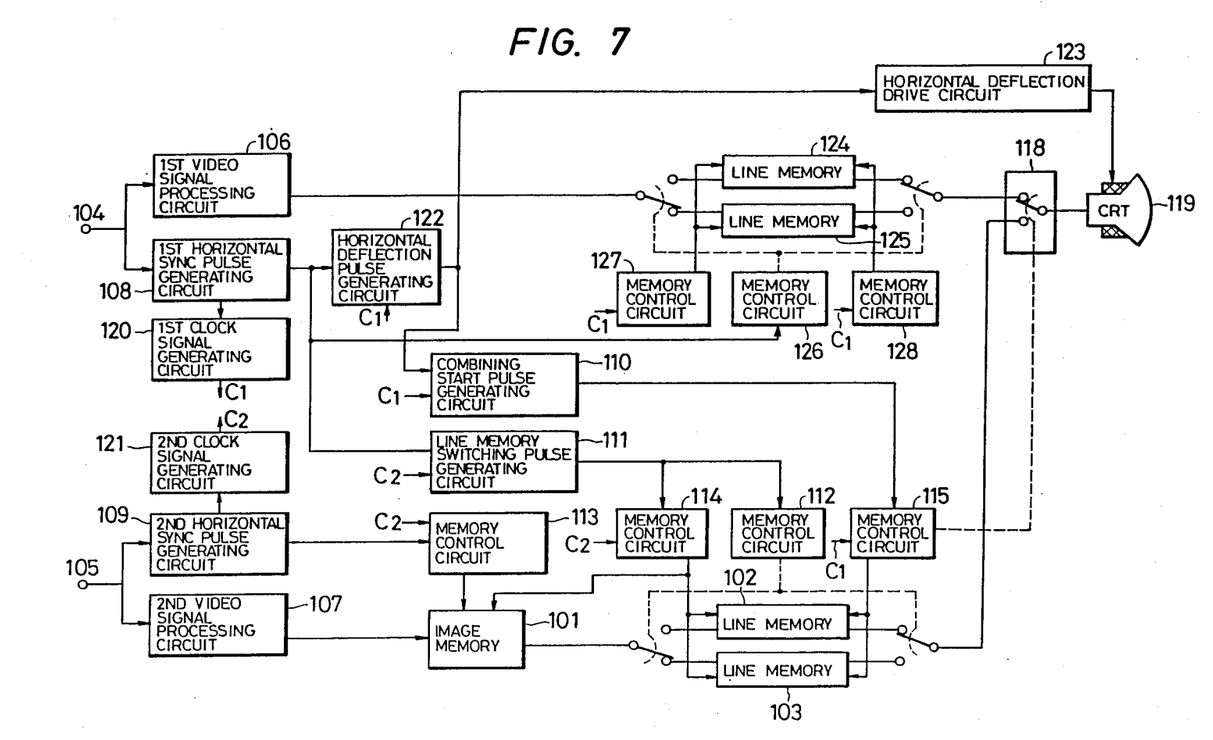
FIG. 7 is a block circuit diagram of a second embodiment of a television receiver according to the present invention, for providing double-speed display scanning.
Figure 8:
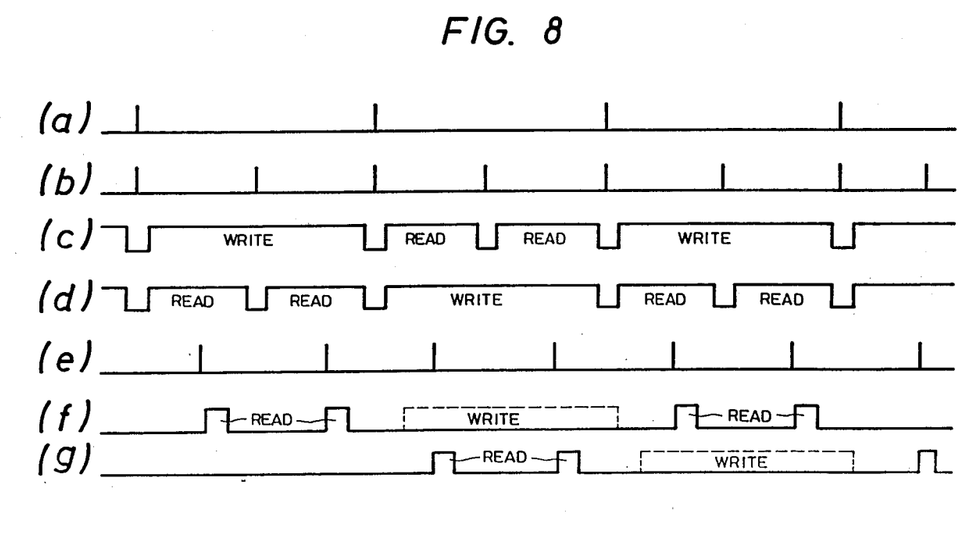
FIG. 8 is a waveform diagram for describing the manner in which time-axis compression of main image display data is accomplished, for the embodiment of FIG. 7.

A second embodiment of a television receiver display apparatus according to the present invention will now be described, in which horizontal display scanning of both the main image and secondary image is executed at twice the scanning rate of the first embodiment, i.e. in which each line of the main image is displayed twice in succession within successive horizontal scanning intervals of the display, each of which is approximately one-half of the horizontal sync pulse period of the composite video signals. FIG. 7 is a block diagram of this embodiment, while FIG. 8 is a waveform diagram illustrating the operation for double-speed scanning of the main image. and 7. In the following, it will be assumed that the embodiment operates in accordance with the NTSC standards. Circuit blocks in FIG. 7 which are identical to circuit block shown in FIG. 4 are denoted by corresponding reference numerals, and a more detailed description will be given of these than was provided in the description of the first embodiment.

Numeral 120 denotes a first clock signal generating circuit, which produces a train of clock pulses (referred to in the following as the first clock signal) by frequency multiplying the first horizontal sync pulses from circuit 108. In this embodiment, frequency multiplication by a factor of 1716 is performed, so that since the frequency of the horizontal sync pulses is 15.73 kHz, the clock pulse frequency produced will be:

$$15.73\ \text{kHz} \times 1716 = 27\ \text{MHz}.$$

In FIG. 7, signal lines which carry this 27 MHz clock signal are indicated by $C_1$, and circuit blocks whose operation is synchronized with the the first clock signal are indicated as receiving that signal as an input.

Numeral 122 denotes a horizontal deflection pulse generating circuit, which executes counting of the first clock signal to produce one output pulse for every 858 (i.e. one-half of 1716) pulses of the first clock signal. Thus, the output pulse frequency from horizontal deflection pulse generating circuit 122 is:

$$15.73\ \text{kHz} \times 2 = 31.46\ \text{kHz}$$

This is twice the frequency of the first horizontal sync pulses. The output signal from horizontal deflection pulse generating circuit 122 is applied through a horizontal deflection drive circuit 123 to a CRT 119, to implement horizontal deflection of the CRT display at twice the frequency of the video signal horizontal sync pulse frequency, i.e. to execute double-speed scanning of the display.

The time-axis compression operation applied to the first video signal data, to enable double-speed scanning of the main image, is illustrated in the waveform diagram of FIG. 8. In FIG. 8, waveform (a) is that of the first horizontal sync pulses from circuit 108, waveform (b) is that of the horizontal deflection pulses from circuit 122, waveform (c) illustrates the sequence of read and write operations executed by a line memory 124, waveform (d) shows the sequence of read and write operations executed by a line memory 125, waveform (e) shows the combination start pulses produced from circuit 110, and waveforms (f) and (g) illustrate the sequence of read and write operations executed by line memories 102 and 103 respectively.

The horizontal deflection pulse generating circuit 122 includes a counter which counts the first clock signal and is periodically reset by the output from first horizontal sync pulse generating circuit 108. As a result, the signal waveforms (i) and (j) of FIG. 6 have the phase relationship shown.

The first video signal is produced from the first video signal processing circuit 106 as a series of data units respectively representing successive picture elements, and is subjected to time-axis compression by a factor of two, to match the double-speed CRT deflection. This time-axis compression is performed by the pair of line memories 124 and 125, with input and output signal switching control of these line memories being performed by a memory control circuit 126, in a similar manner to that described hereinabove for the line memories 102 and 103 controlled by memory control circuit 112. In one condition of switches 129 and 130 controlled by circuit 126, the video signal from video signal processing circuit 106 is supplied to line memory 125 to be written into that memory, while data is read out of line memory 125, and in the opposite condition data is written into line memory 125 and read out of line memory 124. The video data contained in each horizontal scanning interval of the first composite video signal is converted into 858 picture elements (i.e. data units) by video signal processing circuit 106. Each of line memories 124 and 125 is of recirculating configuration, capable of storing 858 picture elements. The memory control circuit 126 is based on a flip-flop, whose output signal level is inverted on each rising edge of successive pulses of the first horizontal sync pulses. A memory control circuit 127 controls the timings at which write-in to line memories 124, 125 are respectively performed, and includes a circuit for performing frequency division of the first clock signal by ½, to produce a 13.5 MHz clock signal, and for periodically gating out bursts of this 13.5 MHz clock signal to be applied to line memories 124 and 125. Write-in operations by these line memories are performed in synchronism with the pulses in these clock signal bursts. A memory control circuit 128 controls read-out operations by line memories 124, 125, by periodically applying bursts of the 27 mHz first clock signal, with data read-out operations by line memories 124, 125 being performed in synchronism with the pulses of these clock signal bursts.

As stated above, each line of video data of the first video signal from video signal processing circuit 106 contains 858 data units representing respective picture elements (being referred to simply as picture elements in the following, for brevity of description), and each set of 858 picture elements is written into line memory 124 or 125 in synchronism with the 13.5 MHz clock signal from memory control circuit 127. While this is taking place, the preceding video signal line is being read out from line memory 124 in synchronism with the 27 MHz clock signal from memory control circuit 128. Upon completion of read-out of 858 picture elements in this way, an address counter in line memory 124 is reset to zero, and read-out of the same 858 picture elements is recommenced. Upon completion of read-out of these 858 picture elements, write-in of data to line memory 125 will have been completed, and since the next horizontal sync pulse is then applied to memory control circuit 126, the connection conditions of switches 129 and 130 are respectively inverted. The above process is then repeated for another line of video data. In this way, each line of the first video signal is transferred through the signal combining circuit 118 to the CRT 119 twice during each horizontal sync interval of the original composite video signal, with the data being transferred to the CRT at a sufficiently high rate to match the double-speed horizontal scanning of the CRT described above.

The operation for double-speed scanning of the secondary image will now be described. Numeral 121 denotes a clock signal generating circuit which frequency-multiplies the 15.73 kHz output pulses from the second horizontal sync pulse generating circuit 109 by a factor of 1716, to thereby produce a second clock signal of 27 MHz. Signal lines which carry this second clock signal are indicated as $C_2$ in FIG. 7. The operation is basically similar to that described hereinabove with reference to FIG. 6 for producing two secondary images with single-speed CRT scanning. However the relationship between clock signals $C_1$ and $C_2$ will be described in detail. The frequencies of each of clock signals $C_1$ and $C_2$ is approximately 27 MHz. However due to the fact that these signals have been respectively derived using horizontal sync pulses from different composite video signals, signals $C_1$ and $C_2$ will not be in a predetermined mutual phase relationship, i.e. will mutually differ in phase and frequency to some extent. However the frequency of each of clock signals $C_1$ and $C_2$ is precisely equal to 1716 times the frequency of the horizontal sync pulses from which they are respectively derived. Each of clock signals $C_1$ and $C_2$ can be readily derived from the respective horizontal sync pulses by utilizing a phase lock loop circuit to perform frequency multiplication of the horizontal sync pulses.

Figure 6:
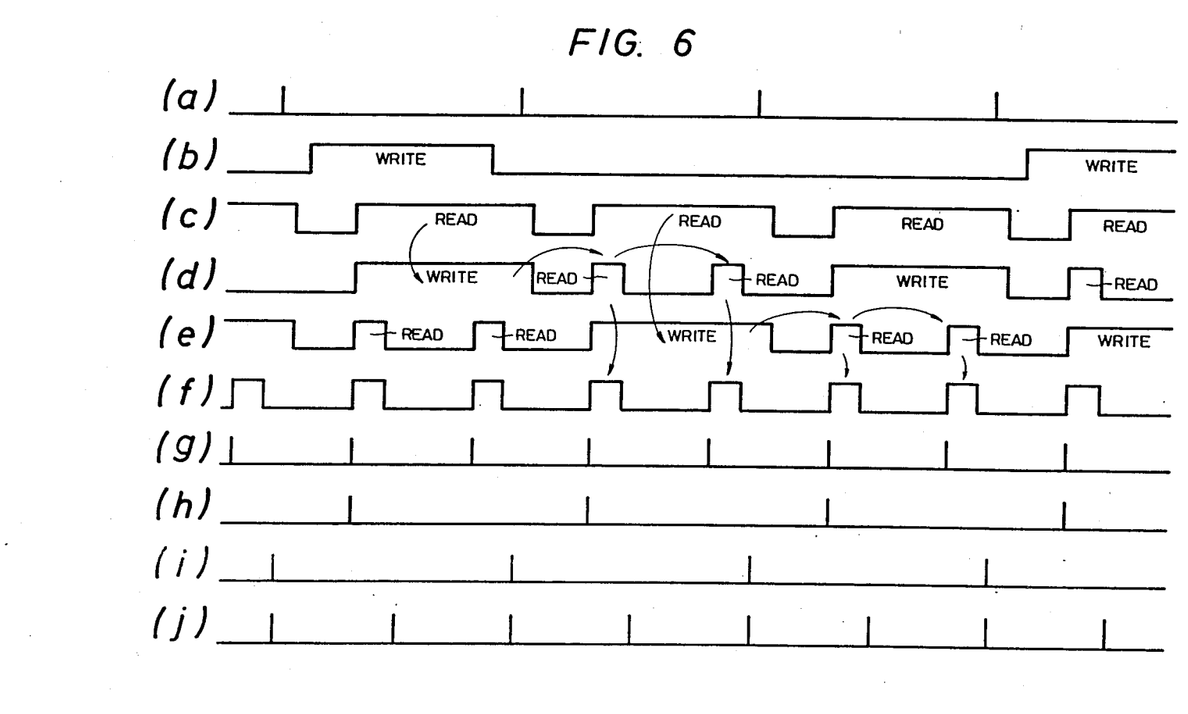
FIG. 6 is a waveform diagram for describing a mode of operation of the embodiment of FIG. 4 whereby two secondary images are displayed.

1716 pulses of second clock signal $C_2$ are produced within one period of the horizontal sync pulses from circuit 109, shown in (a) of FIG. 6. Memory control circuit 113 includes a counter circuit which divides the second clock signal by 6, to produce a 4.5 MHz clock signal. When a control signal produced in memory control circuit 113 (shown in (b) of FIG. 6) is at the high logic level, a burst of that 4.5 MHz clock signal is applied to control write-in to image memory 101, i.e. data is written into image memory 101 at a rate of =4.5 MHz. This rate corresponds to a total of 4.5/15.73=286 picture elements within each horizontal sync period. The image memory 101 must have sufficient capacity to store video data for one frame (or one field) of the secondary image 12. In order to minimize the amount of memory capacity required for image memory 101, data within the horizontal flyback intervals is omitted, so that only 240 picture elements need be stored for each line of video data. The memory control circuit 113 performs frequency division of the second clock signal $C_2$ by a factor of 6 by a counter which is periodically reset by the second horizontal sync pulses, to thereby produce the control signal waveform shown in (b) of FIG. 6. During each interval in which that control signal is at the high level, the clock signal produced by frequency division of $C_2$ by a factor of six is transferred through an AND gate to control data write-in to the image memory 101, so that a total of 240 of these frequency-divided clock pulses are applied to image memory 101 during one in every three horizontal sync periods of the second video signal. In this way, 240 picture elements of the second video signal are written into image memory 101, once in every three horizontal sync periods. Data for the successive picture elements, from second video signal processing circuit 107, are written into image memory 101 at the timings of rising edges of the clock pulses thus applied from memory control circuit 113.

The internal configurations of the combination start pulse generating circuit 110 and the line memory switching pulse generating circuit 111 are each based upon a counter having a CLEAR input terminal. The first clock signal $C_1$ is applied to combination start pulse generating circuit 110, while second clock signal $C_2$ is supplied to line memory switching pulse generating circuit 111. Circuit 111 begins counting the second clock signal $C_2$, starting from a count of zero when reset by one of the first horizontal sync pulses applied to the CLEAR input, and when a predetermined count value has been attained (established at the time of setting up the circuit), e.g. when a count of 550 is reached, a single output pulse is generated. These output pulses are shown as (h) in FIG. 6. The combination start pulse generating circuit 110 similarly is periodically reset to a count of zero by the first horizontal sync pulses, and counts the first clock signal $C_1$, producing an output pulse when 550 pulses have been counted. These output pulses are shown at (g) in FIG. 6.

The memory control circuit 112 can consist of a T-type flip-flop, producing an output signal which alternately goes to the high and low logic levels in response to successive line memory switching pulses from circuit 111. The output signal from memory control circuit 112 thereby performs alternating changeover of the input and output switch connection conditions of line memories 102 and 103. Memory control circuit 114 consists of circuits for frequency dividing the the second clock signal $C_2$ by a factor of 6, and for counting the resultant frequency divided clock signal, while being periodically reset by the line memory switching pulses. A signal is thereby produced which periodically goes to the high logic level during a count of 0 to 240 of the frequency divided clock pulses, and the AND product of that signal with the frequency divided clock signal is derived to thereby produce periodic bursts of the frequency divided clock signal. This is applied to the image memory 101 and to the line memories 102 and 103, to implement the read operations shown in (c) and the memory write operations shown in (d) and (e) of FIG. 6.

Write-in and read-out operations of image memory 101 (shown in (b) and (c) of FIG. 6) are both performed in synchronism with input clock pulses which are derived by frequency dividing the second clock signal $C_2$ by a factor of 6, i.e. a 4.5 MHz clock. However write-in of successive picture elements is performed on the rising edges of the 4.5 MHz clock pulses from memory control circuit 113, while read-out of picture elements is performed on the falling edges of the 4.5 MHz clock signal from circuit 114. In this way time-sharing write and read operations are executed, so that time-overlap of these operations is possible as shown by waveforms (b) and (c) in FIG. 6.

Memory control circuit 115 includes a counter circuit which is reset by the combination start pulses from circuit 110, and which counts the first clock signal $C_1$ pulses. An internal signal having the waveform shown in (f) of FIG. 6 is thereby produced, which periodically goes to the high level for a count of 0 to 240, and which controls the operation of signal combining circuit 118. In addition, the AND product of the signal having the waveform (f) in FIG. 6 with the first clock signal $C_1$ is derived, and is applied as a read-out clock signal to line memories 102 and 103. Each of line memories 102 and 103 must be capable of storing video data corresponding to one line of the secondary image 12, which in this embodiment is 240 picture elements.

In this way, the second video signal from circuit 107 is written into image memory 101 during intervals in which the signal of waveform (b) in FIG. 6 is at the high level, with 240 picture elements being written in by a 4.5 MHz clock signal during each of these intervals, which occur once in every three horizontal sync intervals of the second video signal. These 240 picture elements will constitute one line of the secondary image 12. During each of the intervals in which waveform (f) in FIG. 6 is at the high level, 240 picture elements are read out of line memory 102 or 103 in synchronism with a 27 MHz clock signal. In this way, these 240 picture elements are transferred to CRT 119 twice in every period of the second horizontal sync pulses from circuit 109, with the rate of data transfer being matched to the double-speed horizontal scanning of CRT 119 described hereinabove, i.e. double-speed scanning of the secondary image is implemented.

In this embodiment, the signal combining circuit 118 is simply a switch, controlled by the output from circuit 115 as described above, to selectively transfer from switches 117 and 130 to CRT 119 video data for producing the main image and secondary image.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting senee.

What is claimed is:

1. A television receiver display apparatus for displaying a main image and at least one secondary image in combiantion upon a display screen, based upon data contained in first and second composite video signals respectively, the apapratus comprising:
   an image memory capable of storing video data for one complete television image;
   first and second line memories respectively capable of storing video data for one complete line of a television image;
   first and second video signal processing circuits for producing a first video signal and second video signal respectively from said first composite video signal and second composite video signal, with at least said second video signal being output from said second video signal processing circuit in the form of successive data units representing respective picture elements;

first and second horizontal sync pulse generating circuits for producing first and second trains of horizontal sync pulses from said first and second composite video signals respectively;

circuit means for generating a set of n combining start pulses, where n is an integer, within each period of said first horizontal sync pulses and in synchronism with said first horizontal sync pulses;

circuit means for generating a train of line memory switching pulses each coinciding in time with a leading pulse of one of said set of n combining start pulses;

first memory control circuit means for alternately changing the operating modes of said first and second line memories, in response to successive ones of said line memory switching pulses, between a first condition in which write-in operation is enabled for said first line memory and read-out operation is enabled for said second line memory, and a second condition in which write-in operation is enabled for said second line memory and read-out operation is enabled for said first line memory;

second memory control circuit means for writing one in every m lines of said second video signal, where m is an integer, into said image memory in synchronism with said second horizontal sync pulses, said write-in being performed at a first data transfer rate;

third memory control circuit means for reading out from said image memory successive lines of video data in synchronism with said line memory switching pulses, said read-out being executed at said first data transfer rate, while transferring said read-out data to be alternately stored in said first and second line memories respectively, in accordance with the current statuses of said line memories;

fourth memory control circuit means for alternately reading out, in synchronism with said combining start pulses, successive lines of video data from said first and second line memories, in accordance with the current operating statuses of said line memories, said data read-out being executed at a second predetermined data transfer rate;

signal combining circuit means for combining said video data read out from said first and second line memories with said first video data from said first video signal processing circuit, to produce combined video data;

video display means for displaying said combined video data, and;

horizontal drive circuit means for implementing horizontal scanning of said video display means in synchronism with said first horizontal sync pulses.

2. A television receiver display apparatus according to claim 1 in which said horizontal drive circuit means comprises a horizontal deflection pulse generating circuit for generating horizontal deflection pulses at a frequency which is double the frequency of said first horizontal sync pulses and which are synchronized with said first horizontal sync pulses, and a horizontal output circuit for producing horizontal scanning drive signals in response to said horizontal deflection pulses, to drive said video display means, and further comprising:

third and fourth line memories respectively capable of storing video data for one complete line of a television image;

fourth memory control circuit means for alternately changing the operating modes of said third and fourth line memories, in response to successive ones of said first horizontal sync pulses, between a first condition in which write-in operation is enabled for said third line memory and read-out operation is enabled for said fourth line memory, and a second condition in which write-in operation is enabled for said fourth line memory and read-out operation is enabled for said third line memory;

fifth memory control circuit means for controlling write-in of successive lines of said first video signal into alternate ones of said third and fourth line memories, in accordance with the current operating statuses of said line memories, said write-in being performed at a third data transfer rate, and;

sixth memory control circuit means for controlling read-out of successive lines of video data from alternate ones of said third and fourth line memories, in accordance with the current operating statuses of said line memories, said read-out being performed at a data transfer rate which is equal to twice said third data transfer rate, with data read out from said sixth memory control circuit means being transferred to said signal combining circuit means to be combined with said data read from said first and second line memories, to produce said combined video data to be displayed by said video display means.

3. A television receiver display apparatus for displaying within a portion of a main image representing video data of a first composite video signal, at least one secondary image representing video data of a second composite video signal, comprising:

first and second video signal processing circuit means for producing said video data from said first and second composite video signals, with at least said second video signal processing circuit means functioning to convert said second video data into successive data units corresponding to respective picture elements;

an image memory capable of storing video data corresponding to one frame of said secondary image;

first and second line memories each capable of storing a predetermined number of said data units corresponding to one line of said secondary image;

memory control circuit means for writing into said image memory at a first data transfer rate as successive ones of said data units, in synchronism with horizontal sync pulses contained in said second composite video signal, lines of video data, each composed of said predetermined number of data units, each of said lines being selected as one in m successive scanning lines, where m is an integer, of said second video data, subsequently reading out in synchronism with said horizontal sync pulses, at said first data transfer rate and at timings enabling alternation of write and read operations in said data units, successive ones of said lines from said image memory as successive ones of said data units, writing said lines of video data alternately into said first and second line memories, and alternately reading out said lines of video data from said first and second line memories in synchronism with horizontal sync pulses contained in said first composite video signal, said line memory write-in and read-out operations being executed alternately by each of said line memories at a data transfer which is higher than said first data transfer rate;

signal combining means for combining said video data from said first video processing circuit means with said video data read out from said first and second line memories to produce combined video data, and;

display means for displaying said combined video data to produce said main image and secondary image.

* * * * *